United States Patent Office 3,549,590
Patented Dec. 22, 1970

1

3,549,590
AMINOALKOXYALKENYL-POLYSILOXANES
Norman G. Holdstock, Scotia, Abe Berger and Terry G. Selin, Schenectady, and Raymond J. Thimineur, Scotia, N.Y., assignors to General Electric Company, a corporation of New York
No Drawing. Filed July 17, 1968, Ser. No. 745,347
Int. Cl. C08f 11/04
U.S. Cl. 260—46.5
7 Claims

ABSTRACT OF THE DISCLOSURE

Organopolysiloxanes containing the recurring structural unit:

(1) 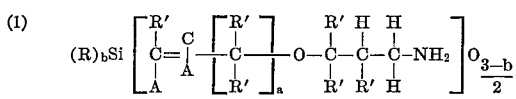

intercondensed with polysiloxane blocks having the average unit formula:

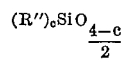

are made by reacting a compound of the formula:

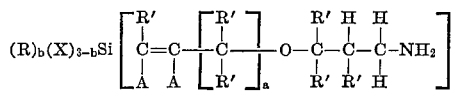

with a siloxane having the average unit formula:

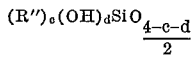

In the above formulas, A is a hydrogen atom or the Si—C bond, R is an organic radical, R' is an organic radical or hydrogen, R" is an organic radical or hydrogen, X is a hydrolyzable radical, $a$ has a value of 1 to 4, $b$ has a value of 0 to 2, $c$ has a value of 1 to 2.5, and $d$ has a value of .002 to 1. The amino-containing organopolysiloxanes in the form of partial carboxylic acid salts are useful in detergent resistant polishes.

---

This invention is concerned with fluid and resinous organopolysiloxanes containing at least one aminoalkoxyalkenyl radical. The term "aminoalkoxyalkenyl radical" refers to a radical of the formula:

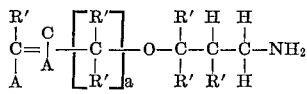

In the above formula and the formulas that follow, A is a hydrogen atom or the Si—C bond, A' is a hydrogen atom or the Si—C bond, R' is an organic radical or hydrogen, and $a$ has a value of 1 to 4.

Silanes containing aminoalkoxyalkyl radicals are known in the art. By-products produced in the synthesis of these prior art silanes, which by-products can be removed only with the greatest difficulty, have masked the desirable properties of this class of compounds.

In spite of the existence of these prior art materials, problems continued to exist in the field of detergent resistant polishes, non-wicking silicone furniture polish, water repellent cloth, fixative type hair sprays, and room temperature vulcanizable silicone compositions which cure to a tough, completely transparent film rapidly without the formation of corrosive by-products.

These problems have now been solved by the compositions of the present invention. When the aminoalkoxyalkenyl radicals are incorporated into polysiloxanes used in polish compositions, the result is improved detergent resistancy, improved gloss, and improved rub-out over

2 what is achieved without the presence of the aminoalkoxyalkenyl radicals. When used as a furniture polish, no wicking problem exists. Polysiloxanes containing aminoalkoxyalkenyl radicals are also useful in textile treating compositions. Textiles treated with such compositions unexpectedly become more water repellent after washing than they were before. Polysiloxanes containing hydrolyzable radicals and aminoalkoxyalkenyl radicals cure exceptionally fast when exposed to atmospheric moisture. This reaction is the basis for an entirely new type of room temperature vulcanizable adhesive. The cure time of silicone resins, particularly the pressure sensitive adhesive type, can be regulated by the amount of aminoalkoxyalkenyl groups incorporated into the resin structure.

The organopolysiloxanes of the present invention contain the structural unit:

(1) 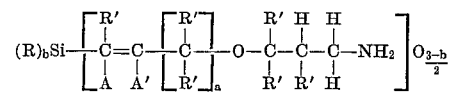

and optionally the structural unit:

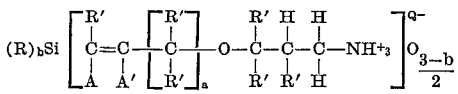

recurring or intercondensed with a siloxane block having the average unit formula

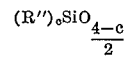

In the above formulas and in the formulas that follow, A and A' are selected from the class consisting of the Si—C bond and hydrogen, $Q^-$ is an anion derived from a monobasic carboxylic acid; R is selected from the class consisting of lower alkyl radicals, 5 to 7 carbon cycloalkyl radicals, mononuclear and binuclear aryl radicals, and mononuclear aryl lower alkyl radicals; R' is a radical selected from the class consisting of hydrogen, lower alkyl radicals, 5 to 7 carbon cycloalkyl radicals, mononuclear and binuclear aryl radicals, mononuclear aryl lower alkyl radicals and further radicals where two R' radicals attached to the same carbon atom taken together with the carbon atom to which they are attached form a cycloalkyl radical having 5 to 7 carbon atoms; R" is selected from the class consisting of lower alkyl radicals, cycloalkyl radicals containing from 5 to 7 carbon atoms, lower alkenyl radicals, mononuclear and binuclear aryl radicals, mononuclear aryl lower alkyl radicals, lower cyanoalkyl radicals, amino lower alkyl radicals, lower alkoxy radicals, and hydrogen, $a$ has a value of one to 4, $b$ has a value of 0 to 2, and $c$ has a value of 1 to 2½. The siloxane block can contain from 1 to 5,000 or more organosiloxy units, and preferably contains from 5 to 500 dimethylsiloxy units.

More specifically, R is a radical selected from the class consisting of lower alkyl radicals having 1 to 8 carbon atoms, e.g., methyl, ethyl, propyl, butyl, octyl, etc. radicals; cycloalkyl radicals having 5 to 7 carbon atoms in the ring, e.g., cyclopentyl, cyclohexyl, cycloheptyl, etc. radicals; mononuclear and binuclear aryl radicals, e.g., phenyl, tolyl, naphthyl, xylyl, biphenyl, etc. radicals; and mononuclear aryl lower alkyl radicals, e.g., benzyl, phenylethyl, etc. radicals; R' is a radical selected from the class consisting of hydrogen; lower alkyl radicals having 1 to 8 carbon atoms, e.g., methyl, ethyl, propyl, butyl, pentyl, heptyl, etc. radicals; cycloalkyl radicals having 5 to 7 carbon atoms in the ring, e.g., cyclopentyl, cyclohexyl, cycloheptyl, etc. radicals; mononuclear and binuclear aryl radicals, e.g., phenyl, tolyl, naphthyl, xylyl, biphenyl, etc. radicals; and mononuclear aryl lower alkyl radicals, e.g., benzyl, phenylethyl, etc. radicals; and further radicals where two R' radicals attached to the same carbon atom taken together with the carbon atom to which they are attached, form a cycloalkyl radical having 5 to 7 carbon atoms in the ring, e.g., cyclophentyl, cyclohexyl, cycloheptyl, etc. radicals, and hydrogen, R'' is a radical selected from the same class as the R radical and, in addition, can be selected from further radicals including lower cyanoalkyl radicals, e.g., cyanomethyl, cyanoethyl, cyanopropyl, cyanobutyl, etc. radicals; lower aminoalkyl radicals, e.g., aminomethyl, aminoethyl, aminopropyl, aminobutyl, etc. radicals and lower alkoxy radicals, e.g., methoxy, ethoxy, propoxy, butoxy, etc. radicals.

The prefix "lower" used above in modifying the radicals containing alkyl groups indicates that the alkyl groups contained on the radicals each have 8 or fewer carbon atoms.

In order to achieve emulsion stability when using an aqueous carrier, the organopolysiloxanes containing the structural unit shown in Formula 1 can be converted into a partial amine salt by reacting the organopolysiloxane with a carboxylic acid.

The organopolysiloxane copolymer is converted to a partial aliphatic carboxylic acid salt by reacting the copolymer with an amount of aliphatic carboxylic acid sufficient to convert from 10 to 50 percent of the amine groups to amine salt groups. In general, the reaction between the amine groups of the copolymer and the aliphatic carboxylic acid is substantially stoichiometric.

Among the aliphatic carboxylic acids which are useful in preparing the salts of the present invention are all of the conventional monobasic aliphatic carboxylic acids, both saturated and unsaturated. Useful aliphatic carboxylic acids include the saturated monobasic acids free of substituents other than carbon and hydrogen, aside from the carboxyl group, such as formic acid, acetic acid, n-butyric acid, caproic acid, lauric acid, stearic acid, etc. Among the aliphatically unsaturated acids containing only carbon and hydrogen outside of the carboxyl group are angelic acid, tiglic acid, crotonic acid, acrylic acid, undecylenic acid, oleic acid, linoleic acid, linolenic acid, etc.

While all of the foregoing acids are useful in forming the salts of the present invention, in the preferred embodiment of our invention, the acid is a lower molecular weight acid, such as acids containing up to about 8 carbon atoms. The preferred specific aliphatic carboxylic acid useful in the practice of the present invention is acetic acid.

In order to form the salt of the present invention, the aliphatic carboxylic acid is merely dissolved into the organopolysiloxane copolymer and the amine salt of the acid is immediately formed and is a stable product. On the other hand, as is described in more detail hereinafter, the organopolysiloxane copolymer can be converted to the acid salt at the same time as the organopolysiloxane copolymer is formed into a polish composition by the addition of the aliphatic carboxylic acid at the same time as the other components of the polish composition are added. The result is equivalent in both cases.

Siloxane units of Formula 1 include, for example:

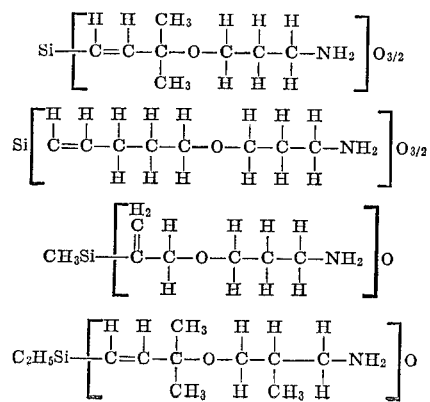

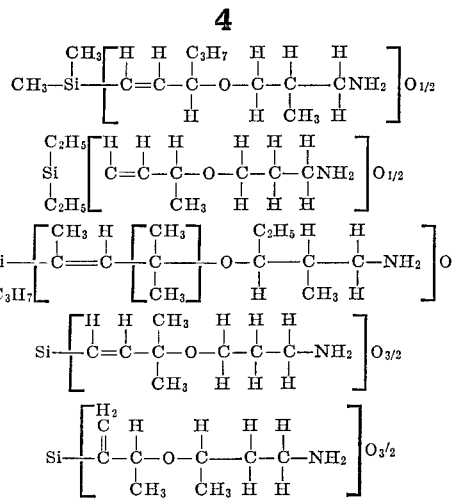

Organopolysiloxanes within the scope of the present invention include those containing a plurality of siloxane units containing one silicon-bonded aminoalkoxyalkenyl radical per silicon atom. Also, included are organopolysiloxanes containing radicals other than aminoalkoxyalkenyl radicals derived from cohydrolyzable monomers or coreactants and less than one aminoalkoxyalkenyl radical per silicon atom. By controlling the proportions of the two types of siloxane units, the ratio of aminoalkoxyalkenyl radicals to silicon may vary within broad limits. Thus, organopolysiloxanes can be formed containing from one aminoalkoxyalkenyl radical per 500 silicon atoms or more to one aminoalkoxyalkenyl radical per silicon atom.

The aminoalkoxyalkenyl organopolysiloxanes of the present invention can be prepared by a number of different methods. One method involves the cohydrolysis of an aminoalkoxyalkenylsilane containing hydrolyzable radicals with a second silane containing one or more hydrolyzable radicals and which, in addition, can contain 1 to 3 monovalent organic radicals. Another method of forming compositions which fall within the scope of the present invention involves reacting an aminoalkoxyalkenylsilane containing hydrolyzable groups with a polysiloxane fluid, resin, or gum containing silanol groups.

The usual method for preparing a silane containing a cyanoalkoxyalkenyl group and one or more hydrolyzable radicals is as follows:

An acetylenic alcohol within the scope of the formula:

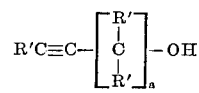

is reacted with a nitrile within the scope of the formula;

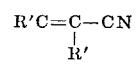

in the presence of a basic catalyst to produce an acetylenic nitrile within the scope of the formula:

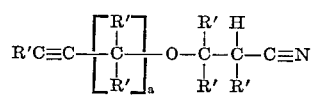

The basic catalyst used in the reaction is preferably sodium methoxide when the acetylenic alcohol is a tertiary alcohol and a polystyrene supported ammonium base when the acetylenic alcohol is a primary alcohol. However, other strong base catalysts may also be used, such as other alkali metal alkoxides or alkali metal hydroxides.

Acetylenic alcohols which can be employed include:

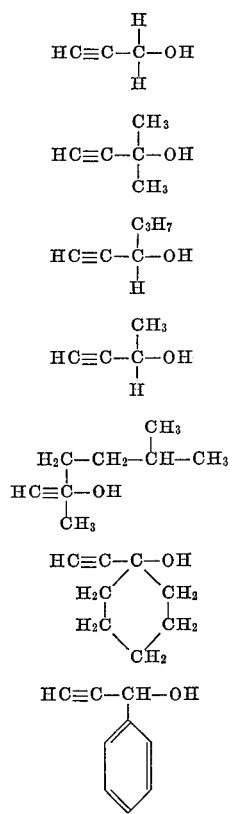

Nitriles which can be employed include:

$CH_2=CH-CN$

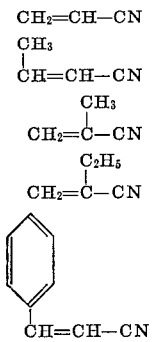

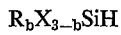

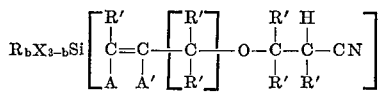

The acetylenic nitrile is then reacted with a silane within the scope of the formula, $$R_bX_{3-b}SiH$$

in the presence of a platinum compound catalyst to produce a cyanoalkoxyalkenylsilane of the formula:

$$R_bX_{3-b}Si\left[\begin{matrix}R'\\C=C\\A\ A'\end{matrix}\right]\left[\begin{matrix}R''\\C\\R'\end{matrix}\right]_a -O-\begin{matrix}R'\ H\\C-C-CN\\R'\ R'\end{matrix}$$

In the above formulas and those that follow, X is a hydrolyzable radical preferably selected from the class consisting of lower alkoxy radicals, e.g., methoxy, ethoxy, propoxy, butoxy, etc. radicals; mononuclear aryloxy radicals, e.g., phenoxy, etc. radicals; lower aminoalkyl radicals, e.g., aminomethyl, aminoethyl, aminopropyl, aminobutyl, etc., radicals; and lower dialkylaminoxy radicals, e.g., dimethylaminoxy, dibutylaminoxy, dihexylaminoxy, etc.

The platinum compound catalyst can be selected from that group of platinum compound catalysts which are operative to catalyze the addition of silicon-hydrogen bonds across olefinic bonds. Among the many useful catalysts for this addition reaction are chloroplatinic acid as described in U.S. Pat. 2,823,218—Speier et al., the reaction product of chloroplatinic acid with either an alcohol, an ether or an aldehyde as described in U.S. Pat. 3,220,972—Lamoreaux, trimethylplatinumiodide and hexylmethyldiplatinum as described in U.S. Pat. 3,313,773—Lamoreaux, the platinum-olefin complex catalysts as described in U.S. Pat. 3,159,601—Ashby, and the platinum cyclopropane complex catalyst described in U.S. Pat. 3,159,662—Ashby.

The SiH-olefin addition reaction may be run at room temperature or temperatures up to 200° C., depending upon catalyst concentration. The catalyst concentration can vary from $10^{-7}$ to $10^{-3}$ and preferably $10^{-5}$ to $10^{-4}$ mole of platinum as metal per mole of acetylene-containing molecules present.

When the cyanoalkoxyalkenylsilane contains halide radicals as the hydrolyzable groups, these groups may be replaced with alkoxy groups. The alkoxylation can be accomplished by reacting the cyanoalkoxyalkenylsilane containing hydrolyzable silicon-bonded halide radicals with, preferably, a non-acid forming material, such as a lower alkyl orthoformate, preferably methyl orthoformate.

After the alkoxy derivative is formed from the corresponding halide-containing material, the nitrile radical is converted to an amine radical by hydrogenation. The hydrogenation is conducted at from 20 to 40 p.s.i. at 50° to 150° C. in the presence of a hydrogenation catalyst, such as nickel or cobalt.

The preferred conditions for the hydrogenation reaction are a pressure of 20 to 100 p.s.i., a temperature of 30° to 120° C., and the presence of a Raney nickel catalyst. The catalyst preferably contains no acidic impurities, as these interfere with the reaction and cause the formation of undesirable by-products.

It was quite unexpected that the hydrogenation could be accomplished at 20 to 100 p.s.i. as the usual pressure conditions for this type of reaction are generally in the range of 1000 to 2000 p.s.i. The hydrogenation step is represented by the following general equation:

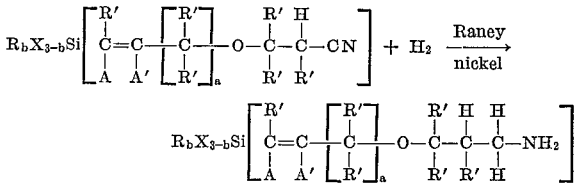

The nitrile radical is easily hydrogenated to the exclusion of the olefinic double bond by stopping the hydrogenation after the amine is formed and before the double bond is hydrogenated.

The following examples are illustrative of the polysiloxanes prepared according to the practice of our invention and are not intended for purposes of limitation. All parts are by weight.

The catalyst solution which was used in the SiH-acetylene addition reactions in the following examples was a platinum coordinate catalyst solution formed by the reaction of chloroplatinic acid and octyl alcohol. The preparation of the catalyst solution is disclosed in Example 1 of U.S. Pat. 3,220,972—Lamoreaux. Chemical analysis of this solution showed it to contain 3.5 atoms of chlorine per atom of platinum and 0.035 gram of platinum per gram of solution.

EXAMPLE 1

Room temperature vulcanizing adhesive

To a small, one-necked flask containing a solution of 84 parts of 3,3-dimethylpropargyl alcohol and 53 parts of acrylonitrile was added one part of solid (powdered) sodium methylate. The mixture was stirred at 22°–25° C. by means of a magnetic stirrer. After a reaction time of 18 hours, gas chromatographic analysis indicated that the reaction was essentially complete. To the mixture was added 5 parts of trimethylchlorosilane to destroy the catalyst. After filtering the reaction mixture to remove the solids present (mostly NaCl), the clear, pale-orange filtrate was fractionally distilled under vacuum. There was obtained 115 parts (84% of theory) of the desired beta-(dimethylpropargyloxy)propionitrile, boiling at 57°–61° C./1.3 mm. Hg ($n_D^{25}$ 1.4328). Gas chromatography indicated a purity of greater than 99%.

Into a three-necked flask equipped with a magnetic stirrer, reflux condenser, thermometer, and addition funnel were placed 96 parts of beta-(dimethylpropargyloxy)-propionitrile and one part of the platinum coordinate catalyst solution. To the addition funnel was charged 171 parts of trimethoxysilane. The acetylenic compound containing the catalyst was heated and stirred. When the temperature reached 110° C., 25 parts of trimethoxysilane was added dropwise. The mixture was heated to 120° C. and a mild exothermic reaction set in. When the temperature reached 125° C., a very rapid reaction caused vigorous refluxing (210° C. pot temperature). After cooling, the reaction mixture was heated at reflux until the reaction temperature again rose to 125° C. and the remainder of the trimethoxysilane was added slowly while maintaining a reflux temperature of 125°–130° C. Continued heating resulted in a second vigorous exotherm. Analysis following the exotherm indicated that all of the beta-(dimethylpropargyloxy)propionitrile had reacted. The reaction mixture was transferred to a distillation flask and the reaction mixture was fractionally distilled at a reduced pressure. There was obtained 81 parts of a material boiling at 118°–121° C./1.1 mm. Hg. The infrared spectrum of this product was consistent with the expected structure, i.e., 3-(2-cyanoethoxy)3,3-dimethyl-1-propenyltrimethoxysilane of the formula:

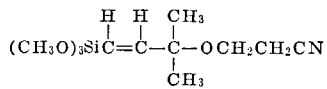

An elemental analysis of the product is set forth in the following table:

Calculated (percent): C, 50.93; H, 8.16; N, 5.40; Si, 10.83. Found (percent): C, 51.23; H, 8.13; N, 5.40; Si, 10.81.

Into a pressure bottle was placed 81 parts of the 3-(2-cyanoethoxy)3,3-dimethyl-1-propenyltrimethoxysilane. To the bottle were added 8 parts of Raney nickel catalyst and ½ part of sodium methoxide. The bottle was placed in a Parr hydrogenator and pressurized with hydrogen to 55 p.s.i. Shaking was started as the reaction mixture was heated to 110 C. As the pressure dropped to 30 p.s.i. additional hydrogen gas was introduced to maintain a pressure of 55 p.s.i. After a time interval of four hours, a total pressure drop of 52 p.s.i. had occurred and further drop in pressure did not occur. The excess pressure of the cooled system was released and a bluish liquid decanted away from the catalyst and fractionated. There was obtained 65 parts of a colorless material having a boiling point of 114° C. at 0.8 mm. Hg pressure. An infrared absorption scan failed to show the presence of the nitrile absorption bands at 4.5 microns and did show the appearance of strong amine absorption bands at 2.1 microns and 6.25 microns which was consistent with the expected structure, i.e., 3-(3-aminopropoxy)-3,3-dimethyl-1-propenyltrimethoxysilane.

A room temperature vulcanizing adhesive was made by dissolving 2.6 parts of the 3-(3-aminopropoxy)-3,3-dimethyl-1-propenyltrimethoxysilane and 33 parts of an isoparaffin solvent having a boiling point between 150° and 180° C. and adding to this solution 97.4 parts of a silanol-stopped fluid of the formula

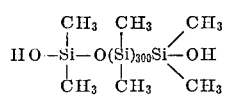

The mixture was stirred until it became a homogeneous solution. The solution formed was used to attach flat glass sheets at their abutting edges. After 3½ hours, the solvent had evaporated from the solution and the residue had cured to a tough, flexible, completely transparent material.

The adhesive was also used for joining metal to metal, paper to metal, metal to glass, and in various applications where a room temperature vulcanizable silicone adhesive would normally be used, and in every case, gave corresponding or superior results to those obtained when using a conventional silicone adhesive based on an acetoxy cure system.

For comparison purposes, a similar adhesive system was prepared with the exception that the 3-methyl-3-(3-aminopropoxy) - 3,3 - dimethyl - 1 - propenyltrimethoxysilane was replaced with gamma-aminopropyltrimethoxysilane. This adhesive composition required a 4 to 5 day time period to effect a cure. When the 3-(3-aminopropoxy)-3,3-dimethyl-1-propenyltrimethoxysilane in the adhesive composition was replaced with 3-(3-aminopropoxy)propyltrimethoxysilane, the composition required 3 days for cure to take place. When the 3-(3-aminopropoxy)-3,3-dimethyl-1-propenyltrimethoxysilane was replaced with gamma-amino-propyltriethoxysilane, 12 to 14 days was required to effect a cure.

EXAMPLE 2

Water repellent composition

A textile treating solution was prepared by mixing 4 parts of the solution prepared by dissolving 2.6 parts of the 3 - (3-aminopropoxy)-3,3 - dimethyl-1-propenyltrimethoxysilane in 33 parts of an isoparaffin solvent having a boiling point between 150° and 180° C. and adding to this solution 97.4 parts of a silanol-stopped fluid of the formula:

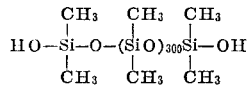

and adding to this solution 45 parts of dichlorodifluoromethane. A homogeneous solution was formed by agitating the mixture in a sealed container. The solution was pressurized in an aerosol can and sprayed on cotton test fabric coupons. The test coupons were allowed to age for 24 hours and the water repellency tested by a standard test method. The coupons were then washed with a laundry detergent, dried, and retested for water repellency. A significant improvement in water repellency was noted after the test coupons were washed, as compared to the test coupons prior to washing.

EXAMPLE 3

Detergent resistant polish

To a reaction vessel was added 60 parts of a silanol chain-stopped polydimethylsiloxane having the formula:

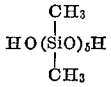

15 parts of 3-(3-aminopropoxy)-3,3-dimethyl-1-propenyltrimethoxysilane and 25 parts of gamma-aminopropyltrimethoxysilane. This reaction mixture was thoroughly mixed and then 0.7 part water was added with stirring.

This resulted in an organopolysiloxane copolymer having a viscosity of about 150 centistokes containing about 4.5% by weight methoxy groups and in which 79.4 mole percent of the siloxane units were derived from the silanol chain-stopped polydimethylsiloxane, 5.9 mole percent of the siloxane units were derived from 3-(3-aminopropoxy)-3,3-dimethyl-1-propenyltrimethoxysilane and 14.7 mole percent of the siloxane units were derived from gamma-aminopropyltrimethoxysilane.

Seven parts of the copolymer described was converted to the partial aliphatic carboxylic acid salt by reaction with 0.35 part acetic acid to produce a partial amine salt in which 41 mole percent of the amine groups were converted to the amine salt of acetic acid.

The partial amine salt was incorporated into a polish emulsion by forming a mixture of 2.62 parts of the salt, 2 parts of a trimethylsilyl end-stopped polydimethylsiloxane having a viscosity of 10,000 centistokes at 25° C., 2 parts of a sorbitan monooleate emulsifier, 0.2 part of a polyoxyethylene sorbitan monooleate emulsifier, 20 parts mineral spirits and 15 parts kerosene. After these components were thoroughly mixed, 50.3 parts of water was added with high shear agitation to form an emulsion. To this emulsion was then added 8.0 parts of aluminum silicate to produce a combination cleaner-polish emulsion.

As a control, the procedure set forth above was followed to produce a copolymer from 60 parts of the silanol chain-stopped polydimethylsiloxane and 40 parts of the gamma-aminopropyltrimethoxysilane but with none of the 3-(3-aminopropoxy)-3,3-dimethyl-1-propenyltrimethoxysilane. Following the procedure outlined above, this material was converted to the partial acetic acid salt in which 41% of the amine groups had been converted to the acetic acid salt of the amine, and then the salt was added to a polish formulation in the same manner as set forth above. In order to compare the polish composition with the control, two enameled panels were polished side by side, one panel with each composition. The composition made from 3-(3-aminopropoxy)-3,3-dimethyl-1-propenyltrimethoxysilane had much better gloss than the control, was much easier to rub out than the control, and showed less streaking than the control. Both compositions were evaluated for detergent resistance. The detergent resistant polish composition of the present invention was unaffected by 80 detergent washing cycles. Each detergent washing cycle involved washing the panel in a 3% solution of a conventional automobile washing detergent at a temperature of 120° F. and then air drying the panel. When this same procedure was repeated with the control polish formulation described above, the surface film showed damage at the end of 10 cycles.

EXAMPLE 4

Pressure sensitive adhesive

A solution was made up containing 55 parts of a resinous copolymer of trimethylsiloxane units and $SiO_2$ units containing 0.55 trimethylsiloxane unit per $SiO_2$ unit, 45 parts of a silanol-stopped gum having the average formula $HO[(CH_3)_2SiO]_{5,000}H$, 0.75 part of 3-(3-aminopropoxy) - 3,3 - dimethyl-1-propenyltrimethoxysilane and 100 parts of toluene. The solution was allowed to stand for 4 days. The solution was then applied to a Mylar tape 2 mils thick, 2 feet long, and 1 inch wide. The tape was allowed to dry for 4 hours at room temperature. The residue after evaporation of the toluene was a 2¼ mil layer of pressure sensitive adhesive. The peel strength of the adhesive was tested according to ASTM D–1000, a standard method for testing peel strength, and was found to be 52 ounces per inch.

EXAMPLE 5

Hair spray

A solution was made up containing 0.75 part of 3-(3-aminopropoxy) - 3,3 - dimethyl - 1 - propenyltrimethoxysilane and 29.2 parts of a silanol-stopped fluid of the formula:

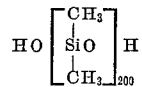

dissolved in 410 parts of 1,1,1-trichloroethane. The solution, along with 660 parts of dichlorodifluoromethane was charged into an aerosol can.

A standard type curler was used to curl the hair of a middle aged female. The solution in the aerosol can was sprayed onto the curled hair until the hair was dampened. The solvent quickly carried the silicone composition into the body of each individual hair and, within minutes, the hair was dry to the touch. The hair was allowed to set for four hours. When the air was released from its confined condition, the hair had excellent curl retention. In addition, the silicone composition could not be induced to flake as many hair setting compositions are prone to do. An examination of the hair showed that the dullness of age had disappeared and the luster of youth was once again apparent in the hair. Somehow, the penetration of the silicone into the surface of each individual hair accentuated the hair color and reflectivity.

What we claim as new and desired to secure by Letters Patent of the United States is:

1. Organopolysiloxanes comprising the recurring structural units:

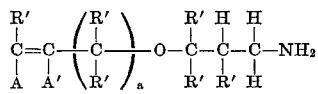

wherein A and A' are selected from the group consisting of:

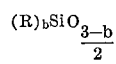

and hydrogen and A and A' must be different, intercondensed with siloxane blocks of the average unit formula:

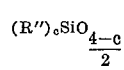

where R is a radical selected from the class consisting of lower alkyl radicals, cycloalkyl radicals, mononuclear and binuclear aryl radicals, and mononuclear aryl lower alkyl radicals, R' is a radical selected from the class consisting of hydrogen, lower alkyl radicals, cycloalkyl radicals containing 5 to 7 carbon atoms, mononuclear and binuclear aryl radicals, mononuclear aryl lower alkyl radicals and further radicals where two R' radicals attached to the same carbon atom, taken together with the carbon atoms to which they are attached form a cycloalkyl radical; R" is a radical selected from the class consisting of lower alkyl radicals, cycloalkyl radicals containing 5 to 7 carbon atoms, lower alkenyl radicals, mononuclear and binuclear aryl radicals, mononuclear aryl lower alkyl radicals, lower cyanoalkyl radicals, lower aminoalkyl radicals, lower alkoxy radicals, and hydrogen, $a$ has a value of one to 4, $b$ has a value of 0 to 2, $c$ has a value of 1 to 2½.

2. Organopolysiloxanes within the scope of claim 1 consisting essentially of the recurring structural unit:

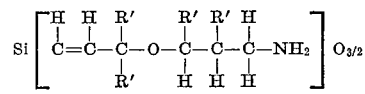

intercondensed with siloxane units of the average unit formula:

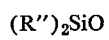

3. Organopolysiloxanes within the scope of claim 2 wherein R" is selected from the class consisting of amino lower alkyl radicals and lower alkyl radicals and mixtures thereof.

4. Organopolysiloxanes within the scope of claim 1 consisting essentially of the recurring structural unit:

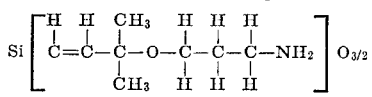

intercondensed with siloxane units of the formula:

$$(CH_3)_2SiO$$

and siloxane units of the formula:

$$NH_2(CH_2)_3SiO_{3/2}$$

5. Organopolysiloxanes within the scope of claim 1 wherein the siloxane blocks contain from 5 to 500 dimethylsiloxy units.

6. The partial amine salts of organopolysiloxanes comprising the recurring structural units:

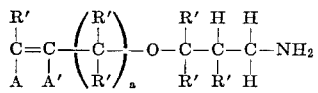

and

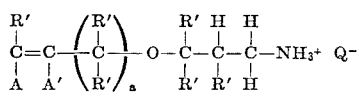

wherein A and A' are selected from the group consisting of:

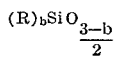

and hydrogen and A and A' must be different, intercondensed with siloxane blocks of the average unit formula:

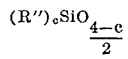

where R is a radical selected from the class consisting of lower alkyl radicals, cycloalkyl radicals, mononuclear and binuclear aryl radicals, and mononuclear aryl lower alkyl radicals, R' is a radical selected from the class consisting of hydrogen, lower alkyl radicals, cycloalkyl radicals containing 5 to 7 carbon atoms, mononuclear and binuclear aryl radicals, mononuclear aryl lower alkyl radicals and further radicals where two R' radicals attached to the same carbon atom, taken together with the carbon atoms to which they are attached form a cycloalkyl radical; R" is a radical selected from the class consisting of lower alkyl radicals, cycloalkyl radicals containing 5 to 7 carbon atoms, lower alkenyl radicals, mononuclear and binuclear aryl radicals, mononuclear aryl lower alkyl radicals, cyano lower alkyl radicals, amino lower alkyl radicals, lower alkoxy radicals, and hydrogen, where $Q^-$ is an anion derived from a monobasic aliphatic carboxylic acid, $a$ has a value of one to 4, $b$ has a value of 0 to 2, and $c$ has a value of 1 to 2½.

7. Organopolysiloxanes within the scope of claim 6 wherein the partial amine salt is the acetic acid salt.

References Cited

UNITED STATES PATENTS 3,355,424   11/1967   Brown _____ 260—46.5
3,369,036   2/1968   Miller _____ 260—448.2

HOSEA E. TAYLOR, Primary Examiner

M. I. MARQUIS, Assistant Examiner

U.S. Cl. X.R.

106—3; 117—138.5; 161—193, 207, 209; 252—305; 260—18, 28, 31.6, 33.6, 448.2, 448.8; 424—47, 71